Figure 3:
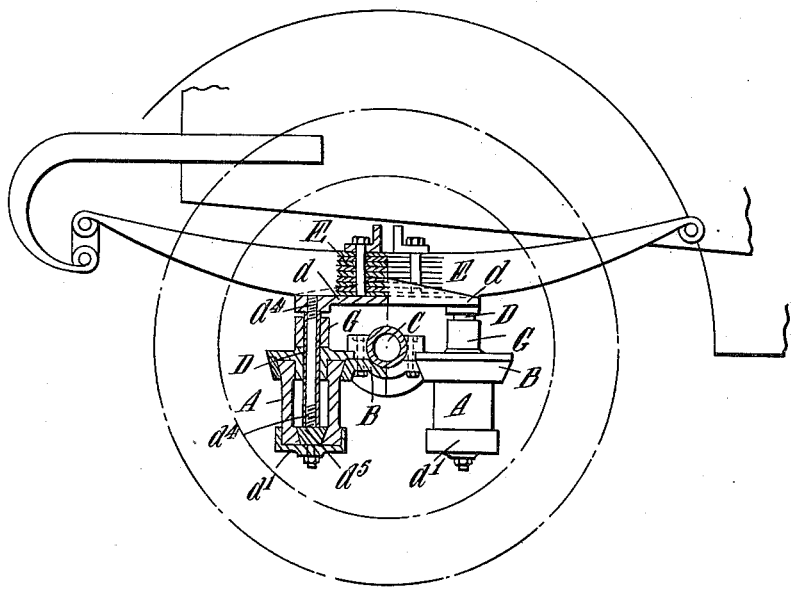

F. WALTON.
VEHICLE SUSPENSION APPARATUS.
APPLICATION FILED APR. 16, 1913.
1,090,954.
Patented Mar. 24, 1914.
2 SHEETS—SHEET 1.
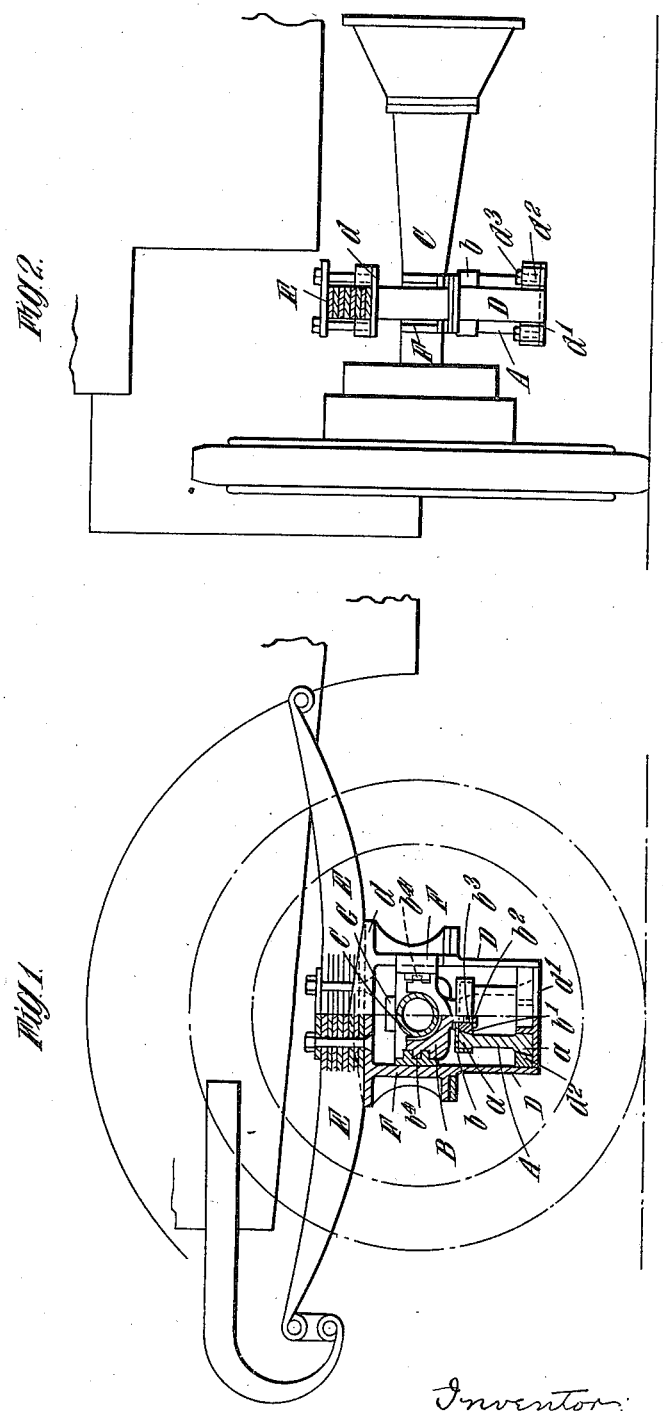

F. WALTON.
VEHICLE SUSPENSION APPARATUS.
APPLICATION FILED APR. 16, 1913.

1,090,954.

Patented Mar. 24, 1914.
2 SHEETS—SHEET 2.

UNITED STATES PATENT OFFICE.

FREDERICK WALTON, OF HOLBORN, LONDON, ENGLAND.

VEHICLE SUSPENSION APPARATUS.

1,090,954.  Specification of Letters Patent.  Patented Mar. 24, 1914.

Application filed April 16, 1913. Serial No. 761,495.

*To all whom it may concern:*

Be it known that I, FREDERICK WALTON, a subject of the King of Great Britain, residing at 114 Holborn, in the county of London, England, have invented certain new and useful Improvements in Vehicle Suspension Apparatus, of which the following is a specification.

This invention relates to vehicle suspension apparatus of the kind in which the ordinary metallic or laminated springs are combined with secondary tension springs.

According to my invention the metallic springs are directly supported by secondary tension springs of india-rubber, which india-rubber springs are preferably tubular with conical thickened ends reinforced by concentric layers of canvas embedded in the indiarubber, the upper and lower ends of each spring being secured respectively in a bracket mounted on the axle, and to an extension member on the metallic spring. Both reinforced ends of the spring are firmly gripped between tapering surfaces, leaving the cylindrical portion free to extend under the weight of the vehicle body and to yield instantly to any shocks which may be transmitted from the wheel axle. I may provide two such indiarubber tension springs, one on each side of the axle, for each metallic spring, but I prefer to employ a single tension spring placed centrally below the axle, which passes through the extension member. The latter member is conveniently in the form of a frame sliding upon guides mounted on trunnions carried by the axle or the spring bracket above referred to, so that torque on the slide or frame is prevented.

In order that the said invention may be clearly understood and readily carried into effect, the same will now be described more fully with reference to the accompanying drawings, in which:—

Figure 1 is an elevation, with one half in section of a single spring suspension device made according to my invention. Fig. 2 is an elevation at right angles to Fig. 1, and Fig. 3 is an elevation, with one half in section, of a double spring suspension device.

A is the indiarubber suspension spring having a cylindrical body and reinforced thickened ends $a$ with tapering or coned surfaces for securing purposes.

B is the bracket fixed on the axle C, to which bracket the upper end of the spring A is secured.

D is the extension member fixed to the underside of the ordinary metallic spring E through the spring table $d$.

Referring to Figs. 1 and 2 the single india-rubber spring A is placed directly below the axle C and is secured to the bracket B by means of the cap $b$, the central cone $b'$ and the nut $b^2$ on the end of a screwed stud $b^3$ projecting from the bottom of the bracket. The extension member D is in the form of a frame having a bottom plate or cap $d'$ receiving the lower end of the spring A and secured upon it by the internally coned ring $d^2$ bolted to the plate by the bolts $d^3$.

The extension member or frame D is free to move up and down relatively to the axle, so that the full weight of the vehicle body is carried by the india rubber tension springs. To guide the frame, and at the same time to allow of such slight angular movement as is necessary to avoid torque upon the rigid parts, I provide guides F at each side of the bracket B and mount these guides upon the trunnions $b^4$ of the bracket. The trunnions allow for angular displacement due to unequal loading of the vehicle and to momentary tilting of the axle in traveling over uneven roads. To prevent undue shock in case of failure of a tension spring or excessive extension of the spring I provide the soft or resilient buffer G on top of the axle or on the bracket B and immediately below the ordinary spring table $d$. The metallic spring can therefore rest on the buffer if the india rubber spring fails or for heavy shocks it may meet the buffer momentarily to relieve the india rubber spring from undue strain.

In the modification shown in Fig. 3, two india rubber springs are employed, one on each side of the axle, and the bracket B projects for some distance at each side to accommodate the springs. The extension members D are in the form of tubes screwed on to studs $d^4$ on the spring table $d$ and the cones $d^5$ respectively, the cones $d^5$ securing the lower ends of the india rubber springs A in their bottom caps $d'$. The buffers G are conveniently in the form of india rubber tubes placed around the upper ends of the extension tubes D.

In both constructions illustrated the metallic spring is supported upon an india rubber tension spring of much smaller mass, the metallic and india rubber springs being in series, so that slight and sudden shocks are largely taken up by the india rubber springs, the more massive metallic springs coming into effective action chiefly for heavier shocks. The india rubber springs thus add greatly to the smoothness of running over rough roads.

What I claim and desire to secure by Letters Patent of the United States is:—

1. In vehicle suspension apparatus, a laminated spring, a secondary spring of india rubber placed in tension, means for suspending the said india rubber spring from the vehicle axle and an extension member on the laminated spring supported by the lower end of the india rubber spring.

2. In vehicle suspension apparatus, a laminated spring, a secondary india rubber spring of tubular form having thickened and reinforced ends, means for suspending the said india rubber spring from the vehicle axle and an extension member on the laminated spring mounted upon the lower reinforced end of the said tubular spring.

3. In vehicle suspension apparatus, a laminated spring, a secondary spring of india rubber placed in tension, means for suspending the said india rubber spring from the vehicle axle, a frame on the bottom of the laminated spring carried by the lower end of the india rubber spring, a guide for the said frame and trunnions for the guide to allow of angular movement of the frame.

In testimony whereof I affix my signature in presence of two witnesses.

FREDERICK WALTON.

Witnesses:
T. SELBY WARDLE,
G. WINLO HOAR.

---

Copies of this patent may be obtained for five cents each, by addressing the "Commissioner of Patents, Washington, D. C."